United States Patent
Clark et al.

(10) Patent No.: US 7,185,468 B2
(45) Date of Patent: Mar. 6, 2007

(54) MULTI-LAYERED FIRE DOOR AND METHOD FOR MAKING THE SAME

(75) Inventors: Randy Jon Clark, Klamath Falls, OR (US); Gary Lee Koepke, Klamath Falls, OR (US); Keith Lynn Lewallen, Salado, TX (US); Brent David Olson, Klamath Falls, OR (US); William Robert Transue, Klamath Falls, OR (US)

(73) Assignee: Jeld-Wen, inc., Klamath Falls, OR (US)

( * ) Notice: Subject to any disclaimer, the term of this patent is extended or adjusted under 35 U.S.C. 154(b) by 259 days.

(21) Appl. No.: 10/284,392

(22) Filed: Oct. 31, 2002

(65) Prior Publication Data

US 2004/0226245 A1    Nov. 18, 2004

(51) Int. Cl.
 *E06B 3/70* (2006.01)
(52) U.S. Cl. .................. 52/455; 52/794.1; 52/784.11; 52/783.13; 52/309.9
(58) Field of Classification Search ............. 52/455, 52/794.1, 204.5, 210, 784.11, 783.13, 232, 52/784.1, 784.15, 309.9; 428/318.4, 532; 49/501
See application file for complete search history.

(56) References Cited

U.S. PATENT DOCUMENTS

| | | | |
|---|---|---|---|
| 619,676 A | 2/1899 | Cronin | |
| 670,939 A | 4/1901 | Rapp | |
| 877,922 A | 2/1908 | Gager | |
| 1,183,842 A | 5/1916 | Alling | |
| D132,040 S | 4/1942 | Cummings | |
| 2,343,740 A | 3/1944 | Birmingham | |
| 2,682,083 A | 6/1954 | Patton | |
| 2,797,450 A | 7/1957 | Ropella | |
| 2,831,793 A | 4/1958 | Elmendorf | |
| 3,098,781 A | 7/1963 | Greten | |
| 3,121,263 A | 2/1964 | Binner | |
| 3,212,948 A | 10/1965 | McMahon | |
| 3,308,013 A | 3/1967 | Bryant | |

(Continued)

FOREIGN PATENT DOCUMENTS

AT        372 495 B        10/1983

(Continued)

OTHER PUBLICATIONS

"Factory-Fitted Douglas Fir Entrance Doors," U. S. Department of Commerce, Commercial Standard CS91-41, Feb. 10, 1941.

(Continued)

*Primary Examiner*—Naoko Slack
*Assistant Examiner*—Chi Q. Nguyen
(74) *Attorney, Agent, or Firm*—Nelson Mullins Riley & Scarborough LLP

(57) ABSTRACT

A door has a core that includes a porous layer having a thickness and two opposing major surfaces. In one construction, the core also includes three fire-retardant layers, and two of the fire-retardant layers are separated by the porous layer. The porous layer and the fire-retardant layers are coupled together. Other constructions include one or more fire-retardant layers in balanced or unbalanced placement around the porous layer.

5 Claims, 6 Drawing Sheets

U.S. PATENT DOCUMENTS

| | | | |
|---|---|---|---|
| 3,484,994 A | 12/1969 | Ashby et al. | |
| 3,512,304 A | 5/1970 | Meuret | |
| 3,533,190 A | 10/1970 | Hilfinger et al. | |
| 3,546,841 A | 12/1970 | Smith et al. | |
| D222,775 S | 12/1971 | Sartori | |
| 3,639,200 A | 2/1972 | Elmendorf et al. | |
| 3,793,125 A | 2/1974 | Kunz | |
| 3,796,586 A | 3/1974 | Hanlon et al. | |
| 3,899,860 A | 8/1975 | Newell | |
| 3,987,599 A | 10/1976 | Hines | |
| D244,736 S | 6/1977 | Palka | |
| D245,824 S | 9/1977 | Palka | |
| 4,104,828 A | 8/1978 | Naslund et al. | |
| 4,125,664 A | 11/1978 | Giesemann | |
| 4,142,007 A | 2/1979 | Lampe et al. | |
| 4,146,662 A | 3/1979 | Eggers et al. | |
| 4,183,187 A | 1/1980 | Simard | |
| 4,236,365 A | 12/1980 | Wheeler | |
| 4,246,310 A | 1/1981 | Hunt et al. | |
| 4,248,163 A | 2/1981 | Caughey et al. | |
| 4,268,565 A | 5/1981 | Luck et al. | |
| 4,277,428 A | 7/1981 | Luck et al. | |
| 4,343,127 A * | 8/1982 | Greve et al. | 52/784.11 |
| D266,042 S | 9/1982 | Moore et al. | |
| D266,720 S | 11/1982 | Moore et al. | |
| 4,361,612 A | 11/1982 | Shaner et al. | |
| 4,364,984 A | 12/1982 | Wentworth | |
| 4,441,296 A | 4/1984 | Grabendike et al. | |
| D274,107 S | 6/1984 | Gordon | |
| D274,944 S | 7/1984 | Coppa | |
| 4,503,115 A | 3/1985 | Hemels et al. | |
| 4,544,440 A | 10/1985 | Wheeler | |
| 4,550,540 A | 11/1985 | Thorn | |
| 4,552,797 A | 11/1985 | Munk et al. | |
| D282,426 S | 2/1986 | Heimberger et al. | |
| 4,579,613 A | 4/1986 | Belanger | |
| 4,610,900 A | 9/1986 | Nishibori | |
| 4,610,913 A | 9/1986 | Barnes | |
| D286,177 S | 10/1986 | Case et al. | |
| 4,622,190 A | 11/1986 | Schultz | |
| 4,632,865 A * | 12/1986 | Tzur | 428/304.4 |
| 4,643,787 A | 2/1987 | Goodman | |
| D292,766 S | 11/1987 | Palka | |
| 4,706,431 A | 11/1987 | Corvese | |
| 4,720,363 A | 1/1988 | Mayumi et al. | |
| 4,811,538 A | 3/1989 | Lehnert et al. | |
| 4,830,929 A | 5/1989 | Ikeda et al. | |
| 4,853,062 A | 8/1989 | Gartland | |
| 4,876,838 A | 10/1989 | Hagemeyer | |
| D304,983 S | 12/1989 | Palka | |
| 4,896,471 A | 1/1990 | Turner | |
| 4,908,990 A | 3/1990 | Yoon et al. | |
| 4,926,963 A * | 5/1990 | Snyder | 181/290 |
| 4,942,084 A | 7/1990 | Prince | |
| D311,957 S | 11/1990 | Hall | |
| D314,242 S | 1/1991 | Mikolaitis | |
| D314,625 S | 2/1991 | Hall | |
| 5,016,414 A | 5/1991 | Wang | |
| 5,020,292 A | 6/1991 | Strom et al. | |
| D319,884 S | 9/1991 | Hall | |
| 5,074,087 A | 12/1991 | Green | |
| 5,074,092 A | 12/1991 | Norlander | |
| 5,075,059 A | 12/1991 | Green | |
| 5,142,835 A | 9/1992 | Mrocca | |
| 5,167,105 A | 12/1992 | Isban et al. | |
| 5,177,868 A | 1/1993 | Kyle et al. | |
| D335,982 S | 6/1993 | Brandon | |
| 5,219,634 A | 6/1993 | Aufderhaar | |
| D338,718 S | 8/1993 | Izzo | |
| 5,239,799 A | 8/1993 | Bies et al. | |
| 5,262,217 A | 11/1993 | Blaauw | |
| 5,293,726 A | 3/1994 | Schick | |
| D349,352 S | 8/1994 | Csati | |
| 5,355,654 A | 10/1994 | Stanley | |
| 5,369,869 A | 12/1994 | Bies et al. | |
| 5,397,406 A | 3/1995 | Vaders et al. | |
| 5,401,556 A | 3/1995 | Ishitoya et al. | |
| 5,417,024 A | 5/1995 | San Paolo | |
| 5,443,891 A | 8/1995 | Bach | |
| 5,470,631 A | 11/1995 | Lindquist et al. | |
| D366,939 S | 2/1996 | Schafernak | |
| D367,121 S | 2/1996 | Schafernak | |
| D370,269 S | 5/1996 | Schafernak | |
| D371,852 S | 7/1996 | Schafernak | |
| 5,543,234 A | 8/1996 | Lynch et al. | |
| 5,558,707 A | 9/1996 | Bernt et al. | |
| D375,424 S | 11/1996 | Burwick | |
| D382,350 S | 8/1997 | Lynch | |
| D388,196 S | 12/1997 | Schafernak et al. | |
| 5,735,098 A | 4/1998 | Kanai et al. | |
| 5,766,774 A | 6/1998 | Lynch et al. | |
| 5,782,055 A | 7/1998 | Crittenden | |
| 5,787,677 A * | 8/1998 | Bolich et al. | 52/784.15 |
| 5,798,010 A * | 8/1998 | Richards et al. | 156/39 |
| 5,816,017 A | 10/1998 | Hunt et al. | |
| 5,887,402 A | 3/1999 | Ruggle et al. | |
| D411,022 S | 6/1999 | Schafernak et al. | |
| 5,916,077 A * | 6/1999 | Tang | 49/501 |
| 5,943,824 A | 8/1999 | Tatara | |
| D426,645 S | 6/2000 | Bonomo et al. | |
| 6,073,419 A | 6/2000 | Moyes | |
| 6,106,944 A * | 8/2000 | Heikkila et al. | 428/397 |
| 6,112,496 A | 9/2000 | Hugus et al. | |
| 6,151,849 A | 11/2000 | Twigg et al. | |
| 6,200,687 B1 | 3/2001 | Smith et al. | |
| 6,205,729 B1 * | 3/2001 | Porter | 52/309.7 |
| 6,271,156 B1 * | 8/2001 | Gleason et al. | 442/413 |
| 6,340,389 B1 | 1/2002 | Klus | |
| 6,358,593 B1 | 3/2002 | Bennett et al. | |
| 6,434,899 B1 | 8/2002 | Fortin et al. | |
| 6,504,098 B2 * | 1/2003 | Seamans | 174/68.3 |
| 6,617,009 B1 * | 9/2003 | Chen et al. | 428/148 |
| 6,643,991 B1 * | 11/2003 | Moyes | 52/784.11 |
| 6,681,541 B2 * | 1/2004 | Wang Chen | 52/455 |
| 6,745,526 B1 * | 6/2004 | Autovino | 52/232 |
| 6,886,306 B2 * | 5/2005 | Churchill et al. | 52/784.11 |
| 2001/0026862 A1 | 10/2001 | Smith et al. | |

FOREIGN PATENT DOCUMENTS

| | | |
|---|---|---|
| CA | 57271 | 10/1986 |
| DE | 16 59 856 A | 11/1969 |
| DE | 3801486 A1 | 8/1989 |
| DE | 202 13 474 U | 10/2002 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0 688 639 A3 | 3/1996 |
| FR | 2 416 332 A | 8/1979 |

OTHER PUBLICATIONS

Douglas Fir Doors, E. A. Nord Company, Specifications of Pacific Northwest Fir Doors, 3 pages, 1953.

Mercer, Henry C., Sc. D., "Ancient Carpenter's Tools," The Bucks County Historical Society, Doylestown, PA, p. 131-133, 1960.

Architectural Woodwork Quality Standards, Guide Specifications and Quality Certification Program, Fifth Edition, The Architectural Woodwork Institute, p. 109.

Lloyd, William B., Millwork Principles and Practices, Manufacture-Distribution-Use, Cahners Publishing Company, Inc., Chicago, IL., in assoc. with The National Woodwork Manufacturers Association, Inc., Table of Contents, pp. 192, 241, 116-117, 167, 173 © 1966.

Feirer, John L., Cabinetmaking and Millwork, Chas A. Bennett Co., Inc., Peoria, IL., pp. 4, 8-14, 145-146, 596-597, 684-687, © 1967.1970.

A recorded voluntary standard of the trade published by the U. S. Dept. of Commerce, Commercial Standard CS73-61, Old Growth Douglas Fir, Sitka Spruce and Western Hemlock Doors, 3 pgs., effective Mar. 20, 1961.

1981 Sweet's Catalogue, Section 8-3/50, p. 7.

Hechinger Brochure— dated Mar. 16, 1986.

Masonite Brand Door Facings—brochure, published in 1987.

Elite Doors—brochure, apparently published in Oct. 1987.

Quality Doors Brochure © 1988.

"The New Mission Series" product brochure by Nord, Part of the JELD-WEN family, 300 W. Marine View Drive, Everett, WA 98201-1030, in existence at least as of Oct. 29, 2002.

1981 Sweet's Catalogue, Section 9.31/MO, p. 3, door in center of page.

VISADOR Brochure, date unknown.

PCT Search Report, corresponding to PCT/US03/34373, mailed on Mar. 17, 2004.

* cited by examiner

MULTI-LAYERED FIRE DOOR AND METHOD FOR MAKING THE SAME

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF THE INVENTION

This invention relates to doors in general, and more particularly to a fire door having several fire-retardant layers.

BACKGROUND

Fire doors are designed and installed in an attempt to protect lives and property from fire, smoke, and heat by providing a barrier to withstand the fire, smoke, and heat for a period of time. To be labeled or certified as a fire door, a door must fulfill the requirements of certain codes or standards that regulate the construction and installation of such doors. These codes or standards include, among others, the Uniform Building Code (UBC), and codes promulgated by the National Fire Protection Association (NFPA), and American Society for Testing and Materials (ASTM).

Private testing laboratories, such as Underwriters' Laboratories and Warnock Hersey, may test for adherence to such codes or standards, and may test for additional attributes. The laboratories may also certify that a fire door meets fire protection requirements after conducting testing (such as destructive testing) of the door. Usually, this certification is expressed as a fire-rating offering a specific level of protection from fire, smoke, and/or heat for a limited amount of time. For example, a 20-minute fire-rated door should, if installed correctly, maintain its structural integrity and provide a barrier to fire, heat, and/or smoke for at least 20 minutes. So long as a door meets relevant fire protection requirements, its design may vary to fulfill other design considerations, such as weight, cost of manufacture, and aesthetic appearance.

An interior routed medium-density fiberboard (MDF) fire door meeting current fire protection requirements generally is constructed of a one-and-one-half inch thick sheet of MDF having a minimum density of approximately 42 pounds per cubic foot (pcf) and a one-eighth of an inch hardboard skin on both sides of the MDF. A single-swing wood fire door using MDF having this thickness and density, and that is three feet wide by eight feet high, weighs nearly 153 pounds. Not only is such a door extremely heavy, but manufacturing it can be costly and difficult as well.

For example, manufacturing a molded-panel fire door that meets current fire protection requirements generally requires using a mold. There are several ways known to prepare molds. One common method is to use matching castings or dies. A molded door generally has two exterior skins, and one mold is required for each skin. To make a custom-ordered door, a new mold must be created. While using molds to make a paneled door is generally less costly on a high-volume basis than machining reliefs into a door, molding custom-ordered doors can significantly add to the manufacturing expense—in some cases, this expense can become cost-prohibitive.

Manufacturing paneled wood doors without molds is known in the art. Such doors generally include two exterior skins with a core inserted between the skins. In one such conventional door, the core generally includes a three-eights-of-an-inch-thick layer of MDF, a three-eights-of-an-inch-thick layer of expanded polystyrene, and another three-eights-of-an-inch-thick layer of MDF. The layers of the core are adhered to one another, as are the external skins and the core. Wood side stiles and top and bottom rails are then adhered to an outer perimeter of the door. Panels are formed by routing a series of grooves into the external skins.

SUMMARY OF THE INVENTION

The present invention includes multi-layered fire doors and methods for making such doors. One embodiment of the present invention provides a fire door that includes a core. The core has a porous layer having a thickness and two opposing major surfaces. The core also has at least three, preferably fire-retardant, additional layers. Each of the three fire-retardant layers has a thickness and two opposing major surfaces. The porous layer and the at least three fire-retardant layers are coupled together. At least two of the at least three fire-retardant layers are separated by the porous layer from the other fire-retardant layers. The fire door can also include first and second exterior layers, each having a thickness and two opposed major surfaces. A grooved first pattern can be disposed on the first exterior layer and a grooved second pattern can be disposed on the second exterior layer.

The fire-retardant layers may be made of any suitable material. In one embodiment, the fire-retardant layers are made of MDF having a density of at least 42 pcf. Likewise, the porous layer can be made of any suitable material. One example is a thermoplastic polymer having a density of at least 1 pcf. The thickness of each of the fire-retardant layers is the same. The thickness of the porous layer is approximately the same as the thickness of each fire-retardant layer. The first and second exterior layers can include a hardboard having a density of approximately 52 pcf. The thicknesses of the first and second exterior layers are approximately the same.

Another embodiment of the present invention provides a fire door that includes a core with a porous layer having a thickness of approximately three-eighths of an inch and two opposing major surfaces. The core also has at least two, preferably fire-retardant, additional layers. Each of the two fire-retardant layers has a thickness of approximately nine-sixteenths of an inch and two opposing major surfaces. The porous layer and the at least two fire retardant layers are coupled together. The at least two fire-retardant layers are separated by the porous layer.

An embodiment of the present invention further provides for methods of making a door having a core with a porous layer and two opposing major surfaces and fire-retardant layers, each having a thickness and two opposing major surfaces. One embodiment of a method according to the present invention includes coupling together a porous layer and at least three fire-retardant layers. At least two of the fire-retardant layers are separated by the porous layer. The door can also include first and second exterior layers each having a thickness and two opposed major surfaces. In one embodiment, the method according to the present invention also includes forming a blank by coupling the first and second exterior layers to the core. An embodiment further includes applying a generally uniform pressure to the blank for a period of time. A further embodiment includes machining a grooved first pattern on the first exterior surface and machining a grooved second pattern on the second exterior surface.

An advantage of one embodiment of the present invention is to provide a fire-rated door that can endure a 20-minute fire test according to at least the following standards: UBC 7-2 (1997), Part I NFPA 252 (1999), UL 10C (1998), ASTM E 2072 (1999), and CAN4 S113 and WH-PN-014 (1985).

Another advantage of one embodiment of the present invention is to provide a lighter-weight fire-rated door, i.e., approximately 120 pounds (having dimensions of three feet by eight feet by one-and-three-quarters of an inch), than is currently available.

Yet another advantage of one embodiment of the present invention is to reduce the complexity and cost of manufacturing wood, paneled fire-rated doors by forming panels in the door by machining, instead of molding.

A further advantage of one embodiment of the present invention is to increase a fire door manufacturer's flexibility in manufacturing customer-ordered wood, paneled fire-rated doors by forming panels in the door by machining, rather than by molding.

Yet a further advantage of one embodiment of the present invention is to improve the insulative qualities, or R-value, of fire-rated doors.

An additional advantage of one embodiment of the present invention is to improve the sound dampening of fire-rated doors.

Yet another additional advantage of one embodiment of the present invention is to reduce a fire-rated door's susceptibility to warping caused by moisture.

Additional advantages of embodiments of the invention are set forth in the detailed description that follows and will become more apparent to those skilled in the art upon examination of the following.

BRIEF DESCRIPTION OF THE DRAWINGS

The accompanying drawings, which are incorporated herein and constitute part of this specification, help to illustrate embodiments of the invention. In the drawings, like numerals are used to indicate like elements throughout.

DETAILED DESCRIPTION

The present invention includes doors, parts of doors, and methods of making doors. One embodiment of the present invention includes a multilayer fire door and methods of making such a door.

Figure 1:
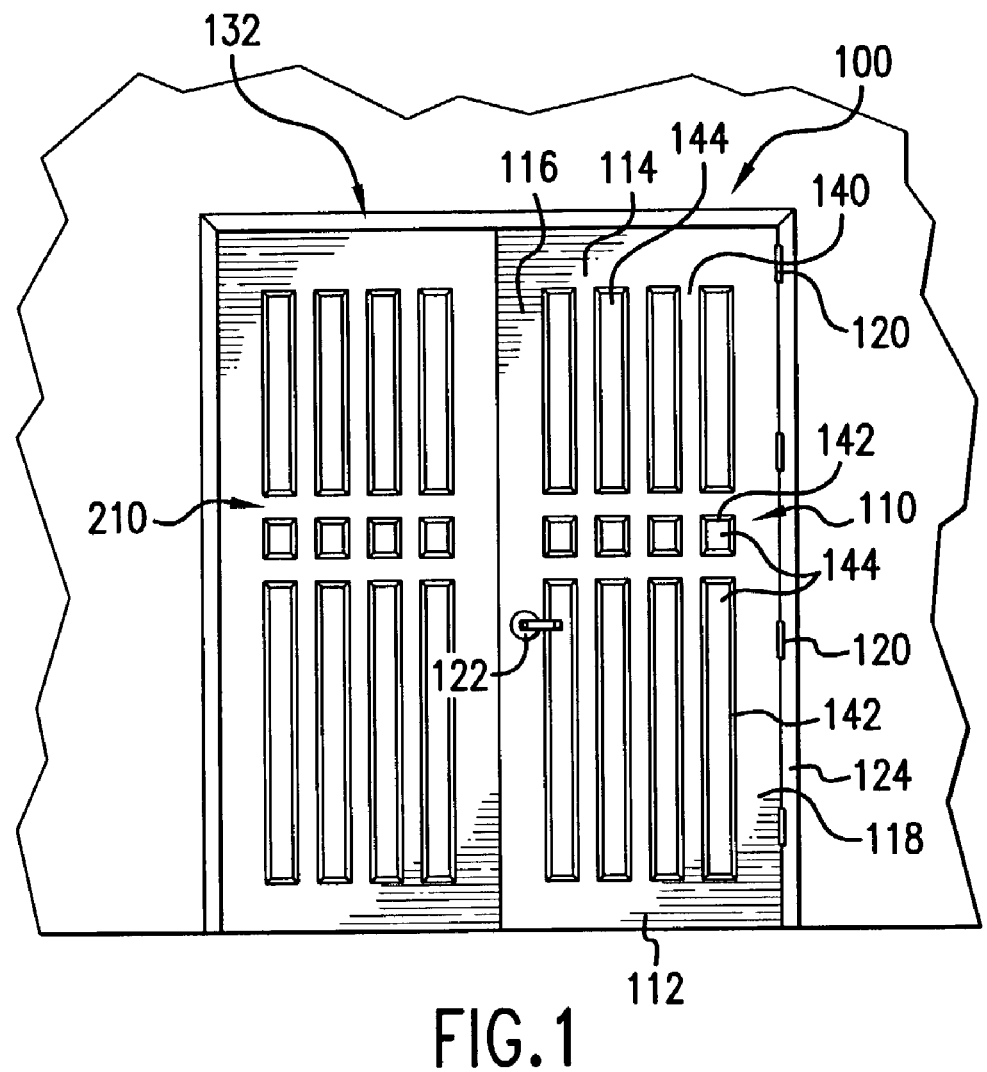
FIG. 1 is a front plan view of a double door system according to an embodiment of the invention.

FIG. 1 shows a front plan view of a door according to an embodiment of the invention. A standard-pair wood, paneled fire door 100 includes two separate but adjacent doors, 110 and 210. The door 100 can also be a single-swing door (not shown). As doors 110 and 210 are identical in material respect, only door 110 will be described in detail.

Door 110 has a major axis and a minor axis. The major axis extends vertically and the minor axis extends horizontally. The door 110 includes an outer peripheral frame including a bottom rail 112, a top rail 114, and a pair of side stiles 116 and 118. The top rail 114 and the bottom rail 112 extend horizontally along the minor axis and generally parallel to one another. The side stiles 116 and 118 extend vertically along the major axis and generally parallel to one another. The top rail 114 and the bottom rail 112 are generally perpendicular to the side stiles 116 and 118. The top rail 114 and the bottom rail 112 are made of MDF having a density of at least 42 pcf. The side stiles 116 and 118 are made of pine or fir, preferably, having a minimum specific gravity of 0.34. The side stiles 116 and 118 can be made of another type or kind of wood. Preferably, the specific gravity of that wood is a minimum of 0.34. Moreover, the rails 112 and 114, and the stiles 116 and 118 may be made of any suitable material.

The door 110 also includes hinges 120 to mount the door 110 to a hinge jamb 410 to allow the door 110 to swing open and closed. As shown in FIG. 1, there are four hinges 120 mounting the door 110 to the hinge jamb 124. The number of hinges 120 can vary to accommodate various design considerations, such as the weight of the door 110. A handle 122 is provided on the door 110 to operate a latch (not shown), which maintains the door 110 in a closed position. While door 210 can be opened and closed, the door 210 preferably is maintained in a closed position. The latch on door 110 maintains the door 110 in a closed position by engaging with a complementary recess (not shown) on door 210. A width and a height of the doors 110 and 210 can vary but, in general, should not exceed approximately three feet in width and eight feet in height.

In general, the above description of the door's features visible in FIG. 1 comprise conventional door construction. It is included here for completeness, and to aid one of ordinary skill in the art in constructing a door according to the present invention.

Figure 2:
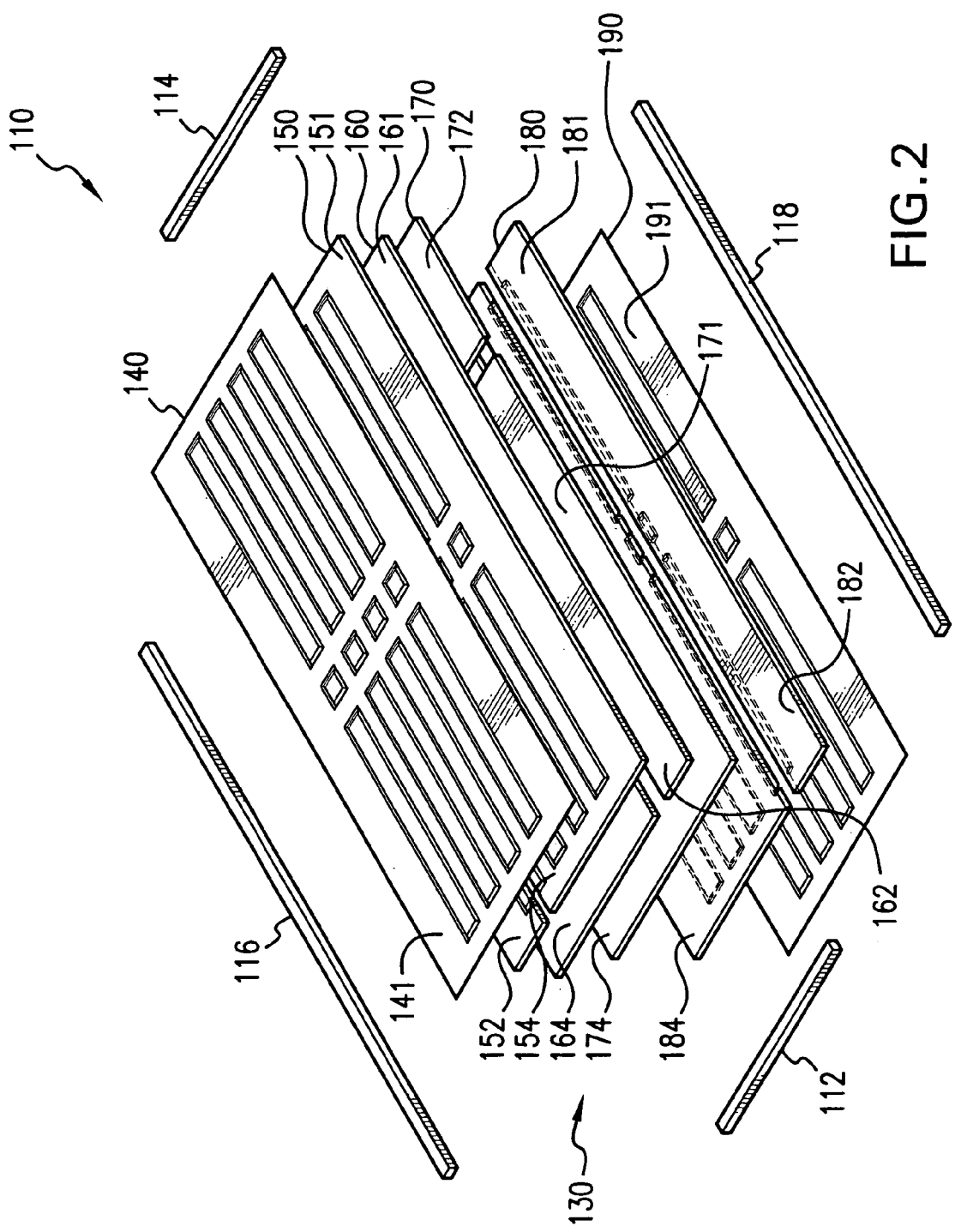
FIG. 2 is a partially-exploded orthogonal view of the door of FIG. 1 prior to machining panels.

Referring now to FIG. 2, the door 110 includes a core 130, which is disposed between a front face 140 and a rear face 190. The core 130 shown has several layers of material. The layers 150, 160, 170, 180 may be made of any suitable material. Preferably, at least three of the layers 150, 160, 180 are made of fire-retardant material. Preferably, the layers of fire-retardant material comprises MDF. Most preferably, the layers comprise MDF having a density of approximately 42 pcf. The core 130 includes a first fiberboard 150, a second fiberboard 160, and a third fiberboard 180. Disposed between the second and third fiberboards 160 and 180 is a layer of porous material 170. The porous layer 170 may be made of any suitable material. Preferably, the porous layer 170 is a foam sheet comprised of a thermoplastic polymer, such as expanded polystyrene, having a density of at least 1 pcf. Alternatively, the porous layer 170 can be a fire-retardant material.

Each of the front face 140, the rear face 190, the first fiberboard 150, the second fiberboard 160, the third fiberboard 180, and the porous layer 170 has two major surfaces and a thickness. A height and width of each of the front face 140, the rear face 190, the first fiberboard 150, the second fiberboard 160, the third fiberboard 180, and the porous layer 170 correspond generally to the height and width of the door 110.

An exemplary embodiment of such a door 110 comprises each of the front face 140, the rear face 190, the first fiberboard 150, the second fiberboard 160, the porous layer 170, and the third fiberboard 180 having dimensions of three feet wide by eight feet high. This exemplary embodiment also comprises the thickness of both the front face 140 and the rear face 190 being one-eighth-of-an-inch. In this exemplary embodiment the thickness of each of the first fiberboard 150, the second fiberboard 160, the porous layer 170, and the third fiberboard 180 is three-eighths-of-an-inch. Alternatively, any other suitable dimensions can be provided.

The front face 140 and the rear face 190 may be made of any suitable material. Preferably, the front face 140 and the rear face 190 are a hardboard made of wood fibers having a density of at least 52 pcf. The hardboard of the front face 140 and the rear face 190 can be made of any other suitable material, preferably, having a density of at least 52 pcf. The thicknesses of the front face 140 and the rear face 190 shown can be the same. The thickness of the front face 140 shown is one-eighth of an inch, as is the thickness of the rear face 190. Alternatively, these thicknesses can be approximately one-eighth of an inch or any other suitable thickness. The two major surfaces of the front face 140 include a front-facing surface 141 and a rear-facing surface (not shown). The front-facing surface 141 and the rear-facing surface of the front face 140 are disposed on opposing sides of the front face 140. Either the front-facing surface 141 or the rear-facing surface of the front face 140 can be disposed adjacent to one of the major surfaces of the first fiberboard 150. In the embodiment shown in FIG. 2, the rear-facing surface of the front face 140 is disposed adjacent to the first fiberboard 150.

The first fiberboard 150 can be formed by disposing a vertical splice 152 adjacent to a main sheet 154. Alternatively, the first fiberboard 150 can be a single sheet. The vertical splice 152 can be disposed proximate the side stile 116. The width of the vertical splice 152 can be any suitable dimension. For example, the width of the vertical splice 152 can be six inches. The width of both the vertical splice 152 and the main sheet 154 correspond generally to the width of the door 110. Thus, the maximum dimensions of the fiberboard 150 are three feet wide by eight feet high. The height of the vertical splice 152 is preferably the same as the height of the main sheet 154. Preferably, the dimensions of the side stiles 116 and 118 are one-and-one-quarter inches by one-and-one-half inches. Preferably, the dimensions of the bottom rail 112 and the top rail 114 is one-and-one-quarter inches by one-and-one-half inches by thirty-three-and-seven-eighths inches. Alternatively, any other suitable dimensions can be used.

The thickness of the first fiberboard 150 shown is three-eighths of an inch. Alternatively, the thickness can be approximately three-eights of an inch or any other suitable thickness. The two major surfaces of the first fiberboard 150 include a front-facing surface 151 and a rear-facing surface (not shown). The front-facing surface 151 and the rear-facing surface of the first fiberboard 150 are disposed on opposing sides of the first fiberboard 150. Either the front-facing surface 151 or the rear-facing surface of the first fiberboard 150 can be disposed adjacent to the rear-facing surface of the front face 140. According to the embodiment, the front-facing surface 151 of the first fiberboard 150 is disposed adjacent to the rear-facing surface of the front face 140. Thus, the rear-facing surface of the first fiberboard 150 is disposed adjacent to one of the major surfaces of the second fiberboard 160.

The second fiberboard 160 is formed by disposing a vertical 162 splice adjacent to a main sheet 164. Alternatively, the second fiberboard 160 can be a single sheet. The vertical splice 162 is disposed proximate the side stile 118. The width of the vertical splice 162 can be any suitable dimension. For example, the width of the vertical splice can be six inches. The width of both the vertical splice 162 and the main sheet 164 corresponds to the width of the door 110. Thus, the maximum dimensions of the fiberboard 160 are three feet wide by eight feet high. The height of the vertical splice 162 is the same as the height of the main sheet 164.

The thickness of the second fiberboard 160 is preferably three-eighths of an inch. It can be approximately three-eighths of an inch or another, selected thickness. The two major surfaces of the second fiberboard 160 include a front-facing surface 161 and a rear-facing surface (not shown). The front-facing surface 161 and the rear-facing surface of the second fiberboard 160 can be disposed on opposing sides of the second fiberboard 160. Either the front-facing surface 161 or the rear-facing surface of the second fiberboard 160 can be disposed adjacent to the rear-facing surface of the first fiberboard 150. According to the embodiment, the front-facing surface 161 of the second fiberboard 160 is disposed adjacent to the rear-facing surface of the first fiberboard 150. Thus, the rear-facing surface of the second fiberboard 160 is disposed adjacent to one of the major surfaces of the porous layer 170.

Preferably, the porous layer 170 is formed by disposing a horizontal splice 172 adjacent to a main sheet 174. Alternatively, the porous layer 170 can be a single sheet. The horizontal splice 172 is disposed proximate the top rail 114. Alternatively, the horizontal splice 172 is disposed proximate the bottom rail 112. The dimension of the horizontal splice 172 can be any suitable dimension. For example, the height of the splice 172 can be 16 inches. The height of both the horizontal splice 172 and the main sheet 174 correspond to the height of the door 110. Thus, the maximum dimensions of the porous layer 170 are three feet wide by eight feet high. The width of the horizontal splice 172 is the same as the width of the main sheet 174. The thickness of the porous layer 170 shown is three-eighths of an inch. In another embodiment, it is approximately three-eighths of an inch or another thickness.

The two major surfaces of the porous layer 170 include a front-facing surface 171 and a rear-facing surface (not shown). The front-facing surface 171 and the rear-facing surface of the porous layer 170 are disposed on opposing sides of the porous layer 170. Either the front-facing surface 171 or the rear-facing surface of the porous layer 170 can be disposed adjacent to the rear-facing surface of the second fiberboard 160. According to the embodiment, the front-facing surface 171 of the porous layer 170 is disposed adjacent to the second fiberboard 160. Thus, the rear-facing surface of the porous layer 170 is disposed adjacent to one of the major surfaces of the third fiberboard 180.

The third fiberboard 180 is formed by disposing a vertical splice 182 adjacent to a main sheet 184. Alternatively, the third fiberboard 180 can be a single sheet. The vertical splice 182 is disposed proximate the side stile 116. Alternatively, the vertical splice 182 can be disposed proximate the side stile 114. The width of the vertical splice 182 can be any suitable dimension. For example, the width of the vertical splice 182 can be approximately six inches. Preferably, the width of both the vertical splice 182 and the main sheet 184 corresponds to the width of the door 110. Thus, the maximum dimensions of the third fiberboard 180 are three feet wide by eight feet high. The height of the vertical splice 182 is the same as the height of the main sheet 184.

The thickness of the third fiberboard 180 is preferably three-eighths of an inch. Alternatively, the thickness can be approximately three-eights of an inch or another suitable thickness. The two major surfaces of the third fiberboard 180 include a front-facing surface 181 and a rear-facing surface (not shown). The front-facing surface 181 and the rear-facing surface of the third fiberboard 180 are disposed on opposing sides of the third fiberboard 180. Either the front-facing surface 181 or the rear facing surface of the third fiberboard 180 can be disposed adjacent to the rear-facing surface of the porous layer 170. According to the embodiment described herein, the front-facing surface 181 of the third fiberboard 180 is disposed adjacent to the rear-facing surface of the porous layer 170. Thus, the rear-facing surface of the third fiberboard is disposed adjacent to one of the major surfaces of the rear face 190.

As described above, the rear face 190 includes a hardboard preferably having a density of at least 52 pcf and the thickness is one-eighth of an inch. Alternatively, the thickness can be approximately one-eighth of an inch or another suitable thickness. The two major surfaces of the rear face 190 include a front-facing surface 191 and a rear-facing surface (not shown). The front-facing surface 191 and the rear-facing surface of the rear face 190 are disposed on opposing sides of the rear face 190. Either the front-facing surface 191 or the rear-facing surface of the rear face 190 can be disposed adjacent to the rear-facing surface of the third fiberboard 180. According to the embodiment, the front-facing surface 191 of the rear face 190 is disposed adjacent to the rear-facing surface of the third fiberboard 180.

To enhance the aesthetic appearance of the door 110, a series of grooves 142 are disposed in the front face 140 of the door 110 forming panels 144. Alternatively, the door 110 can be flush and have no panels. As shown in FIG. 1, one embodiment preferably includes twelve panels 144 formed in the front face 140 of the door 110. The number and shape of the panels 144 can vary depending on the design desired. As will be described in more detail below, the grooves 142 are formed by machining, such as routing, into the door 110. In the embodiment, the depth of the grooves 142 preferably are seven-sixteenths of an inch. Thus, the grooves 142 penetrate the entire thicknesses of the front face 140 and nearly the entire thickness of the first fiberboard 150. Although not shown, panels are preferably formed in the rear face 190. In general, the depth of the grooves in the panels formed in the rear face 190 preferably are the same as that of the front face 140, but alternatively, can be different than that of the front face. Thus, the grooves in the rear face 190 penetrate the entire thickness of the rear face 190 and nearly the entire thickness of the third fiberboard 180.

As described above, a conventional door made entirely of MDF weighs approximately 153 pounds. The weight of the door 110 according to the embodiment as described above is substantially less. Using a similarly dimensioned door, i.e., three feet wide and eight feet high, with the thicknesses described above, the door 110 according to the embodiment should weigh approximately 120 pounds. The weight of the door 110 is reduced further by the weight of the material removed by machining the grooves to form the panels in the door 110.

A method of making the door 110 according to an embodiment will be described next with reference to FIG. 3. As described above, the core 130 includes the first fiberboard 150, the second fiberboard 160, the third fiberboard 180, and the porous layer 170. The method includes coupling together the porous layer 170 and the first fiberboard 150, the second fiberboard 160, and the third fiberboard 180. Preferably, coupling refers to joining by adhering surfaces together with an adhesive, such as glue or cement, as described below. A variety of commercially-available adhesives can be used, including, for example, Tightbond® 100 manufactured by Franklin International, RK-3490 manufactured by H. B. Fuller Co., and WD-1300C0-2F manufactured by Specialty Polymers, Inc. Other suitable methods of joining surfaces together can be used.

In the embodiment shown in FIG. 2, two of the first fiberboard 150, the second fiberboard 160, and the third fiberboard 180 are separated by the porous layer 170. An embodiment of the method of making the core 130 of the door 110 is described in further detail below and in FIG. 4.

Figure 3:
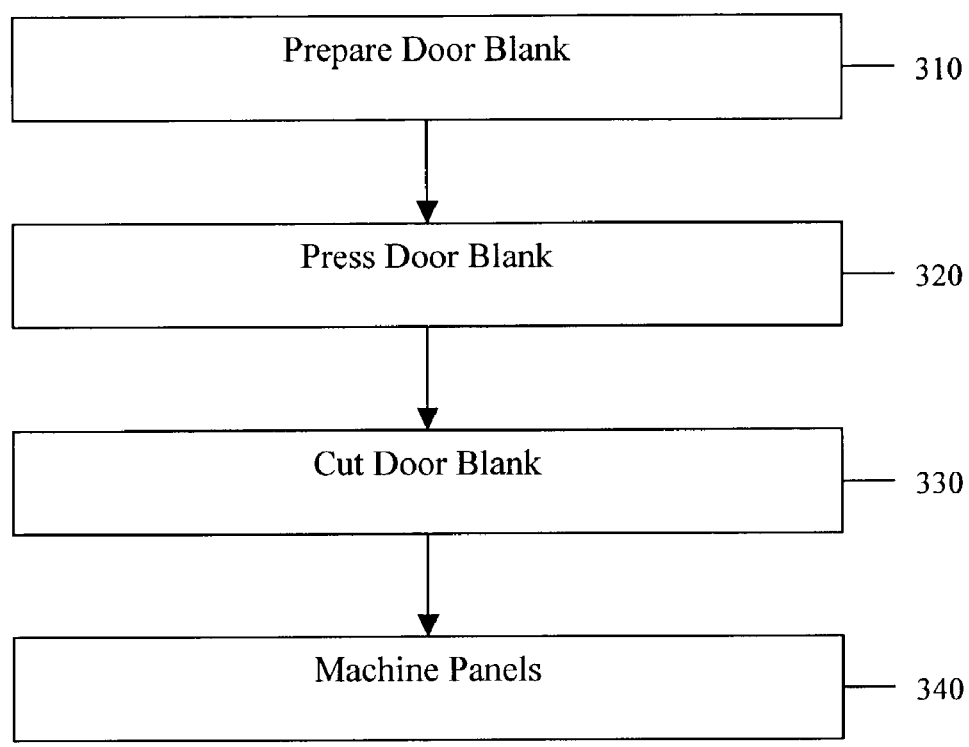
FIG. 3 is a flow diagram of a method of making the door of FIG. 1.

FIG. 3 is a flow chart diagram illustrating a method of making the door 110. A door blank (not shown) is first assembled as indicated by block 310. The rear face 190 can be placed on a flat surface, such as a lay-up table (not shown). Either the front-facing surface 191 or the rear-facing surface of the rear face 190 can be placed on the flat surface. According to the embodiment, the rear-facing surface of the rear face 190 is placed on the flat surface.

Preferably, an adhesive (not shown) is applied to at least one surface of each of the side stiles 116 and 118 and the bottom rail 112 and the top rail 114. As indicated by block 311 in FIG. 4, the side stiles 116 and 118 and the bottom rail 112 and the top rail 114 are attached, in positions corresponding to those shown in FIG. 2, on the door blank as thus far constructed.

Preferably, the adhesive is applied to both the front-facing surface 181 and the rear-facing surface of the third fiberboard 180. Alternatively, the adhesive can be applied to either the front-facing surface 181 or the rear-facing surface of the third fiberboard 180. As indicated by block 312 in FIG. 4, either the front-facing surface 181 or the rear-facing surface of the third fiberboard 180 can be placed on the rear face 190. Preferably, the rear-facing surface of the third fiberboard 180 is placed on and adhered to the front-facing surface 191 of the rear face 190.

Preferably, the adhesive is applied to both the front-facing surface 171 and the rear-facing surface of the porous layer 170. Alternatively, the porous layer 170 can be placed on the third fiberboard 180 with no adhesive applied to the porous layer 170. Alternatively, the adhesive can be applied to either the front-facing surface 171 or the rear-facing surface of the porous layer 170. As indicated by block 313 in FIG. 4, either the front-facing surface 171 or the rear-facing surface of the porous layer 170 can be placed on the third fiberboard 180. Preferably, the rear-facing surface of the porous layer 170 is placed on the front-facing surface 181 of the third fiberboard 180.

Preferably, the adhesive is applied to both the front-facing surface 161 and the rear-facing surface of the second fiberboard 160. Alternatively, the adhesive can be applied to either the front-facing surface 161 or the rear-facing surface of the second fiberboard 160. As indicated by block 314 in FIG. 4, either the front-facing surface 161 or the rear-facing surface of the second fiberboard 160 can be placed on the porous layer 170. Preferably, the rear-facing surface of the second fiberboard 160 preferably is placed on the front-facing surface 171 of the porous layer 170.

Preferably, the adhesive is applied to both the front-facing surface 151 and the rear-facing surface of the first fiberboard 150. Alternatively, the adhesive can be applied to either the front-facing surface 151 or the rear-facing surface of the first fiberboard 150. As indicated by block 315 in FIG. 4, either the front-facing surface 151 or the rear-facing surface of the first fiberboard 150 can be placed on the second fiberboard 160. Preferably, the rear-facing surface of the first fiberboard 150 is placed on and adhered to the front-facing surface 161 of the second fiberboard 161.

Figure 4:
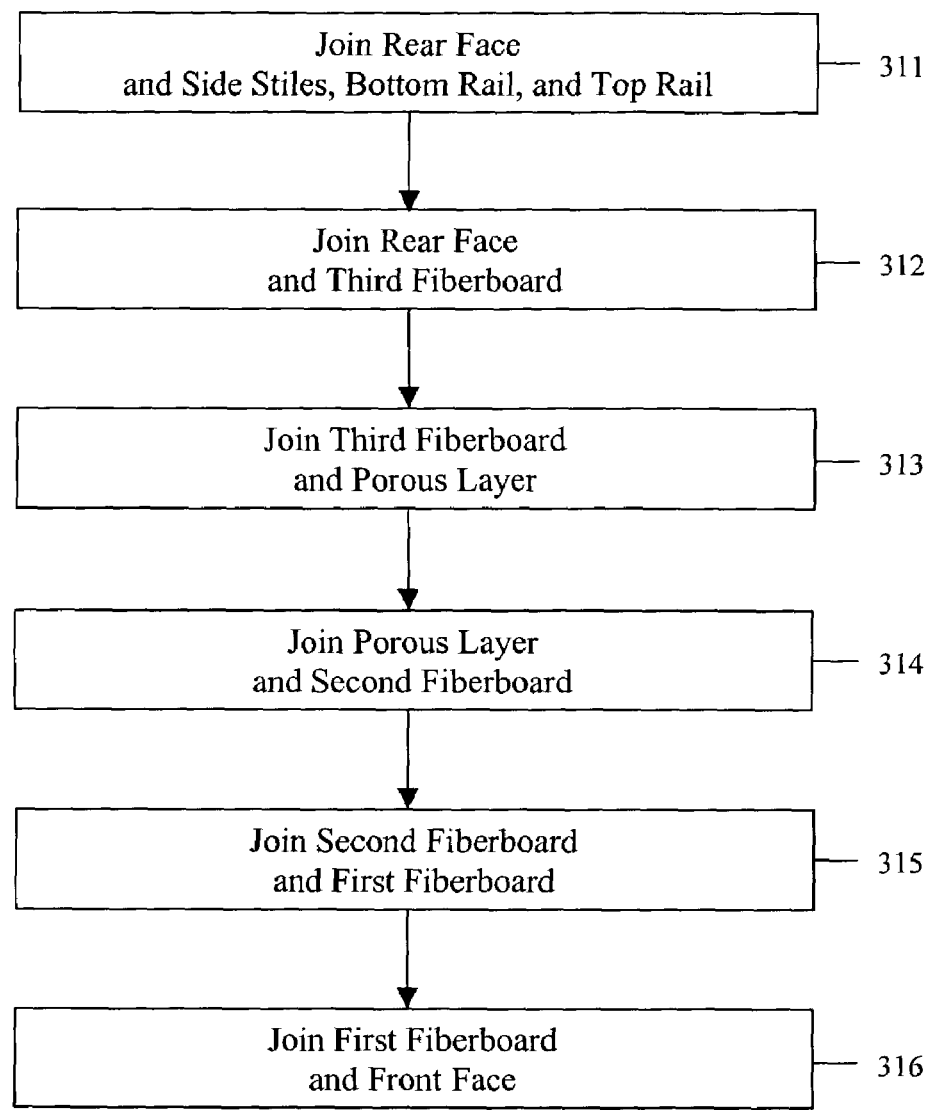
FIG. 4 is a flow diagram of a method of making a door blank of FIG. 1.

As indicated by block 316 in FIG. 4, either the front-facing surface 141 or the rear-facing surface of the front face 140 can be placed on the first fiberboard 150. Preferably, the rear-facing surface of the front face 140 is placed on the front-facing surface 151 of the first fiberboard 150. The door blank of the embodiment has thus been constructed.

As indicated by block 320 in FIG. 3, pressure is applied to the door blank. Preferably, several door blanks are placed one atop the other and placed in a press (not shown) at the same time. Alternatively, only one door is placed in the press. A pressure in a range between 80 and 110 pounds per square inch (psi) is applied to the door blank for 30 minutes. Alternatively, the pressure can be in a range between approximately 80 psi and approximately 110 psi. Alternatively, the time the pressure is applied can be approximately 30 minutes. Alternatively, any other suitable pressure and time can be used. In general, press time will be longer when the ambient temperature is below 65 degrees F. The pressure is removed from the door blank and the adhesive is allowed to adhere for at least approximately eight hours. During this time, the door blank is not manipulated. As indicated by block 330 in FIG. 3, the door blank is cut to a desired width and height. Preferably, the maximum width does not exceed three feet and the maximum height does not exceed eight feet.

As indicated by block 340, a series of grooves 142 are machined into the front face 140 to form the panels 144. Alternatively, the front face 140 can be flush with no panels. Once the panels 144 have been formed, the blank is turned over so that another series of grooves are machined into the rear face 190 to form other panels. The machining is preferably accomplished by routing. Generally, a computer program is written to control a computer numerical control (CNC) milling machine (not shown). The door blank is placed into the milling machine and one side of the door blank is milled according to the design entered into the CNC milling machine. Hardware, such as the door handle 122 is installed. The door 110 can thus be installed into a door frame 132.

Other variations to the embodiments described above are possible. For example, the thickness of any of the layers forming the door can be varied from that described above. Similarly, varying the density of the layers forming the door in the above embodiments is certainly within the ordinary skill in the art.

The embodiments shown in FIG. 2 are an unbalanced core construction; that is, in the embodiments shown in FIG. 2, the number of fire-retardant layers on one side of the porous layer is not equal to the number of fire-retardant layers on the other side of the porous layer. Specifically, the embodiments shown in FIG. 2 include one fire-retardant layer on one side of the porous layer and two fire-retardant layers on the other side of the porous layer. The number of layers on each side of the porous layer can be varied in other embodiments. For example, there can be two layers on one side of the porous layer and three layers on the other side. As another example, there can be an equal number of layers on each side of the porous layer but the thickness of the fire-retardant layers on one side of the porous layer is different than the thickness of the fire-retardant layers on the other side.

Furthermore, a core of the door in accordance with the present invention can have a balanced construction. In order words, a balanced core construction has an equal number of layers on each side of the porous layer. For example, there can be one fire-retardant layer on each side of the porous layer. There can be more than one fire-retardant layer on each side of the porous layer. Moreover, in the balanced construction, the total thickness of fire-retardant layers on one side of the porous layer can be the same as the total thickness of fire-retardant layers on the other side of the porous layer even if the number of layers on each side differs. An example of an embodiment disclosing a balanced construction will be described below.

Figure 5:
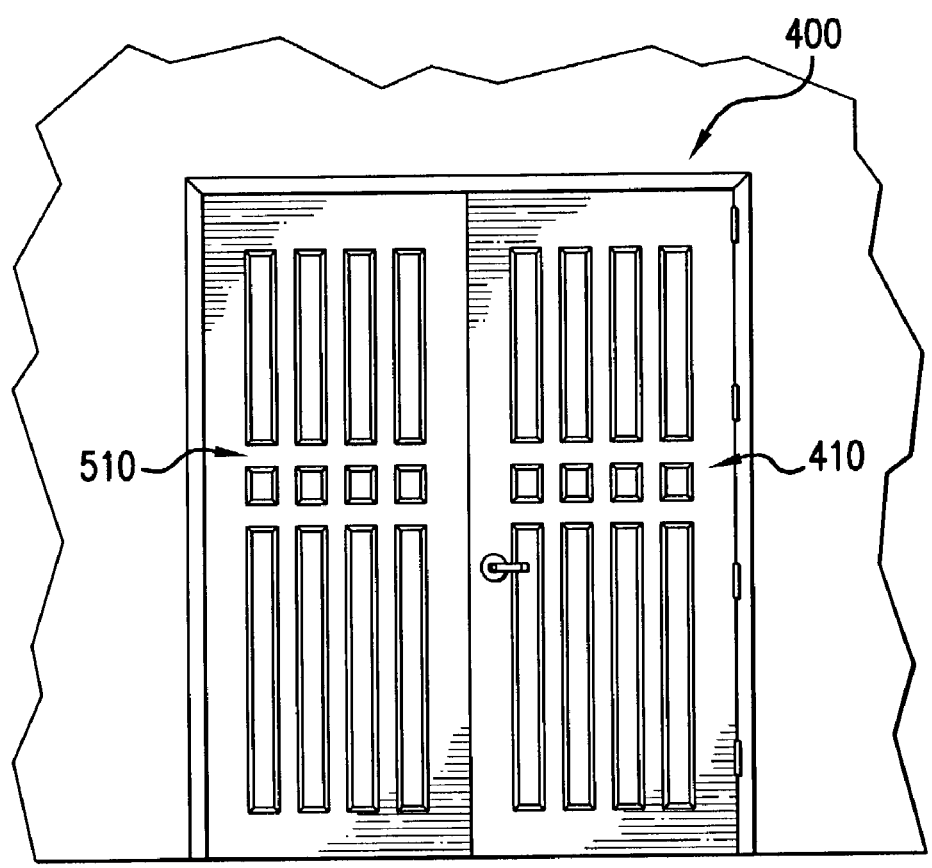
FIG. 5 is a front plan view of a door according to another embodiment of the invention.

FIG. 5 shows a front plan view of a door according to another embodiment of the invention. A standard-pair wood, paneled fire door 400 includes two separate but adjacent doors, 410 and 510. The door 400 can also be a single-swing door (not shown). As the external appearance of door 400 and door 100 are identical in material respect—including the grooves and panels, these identical details will not be repeated. Thus, only the core 430 will be described in detail below. Furthermore, as doors 410 and 510 are identical in material respect, only door 410 will be described in detail.

Figure 6:
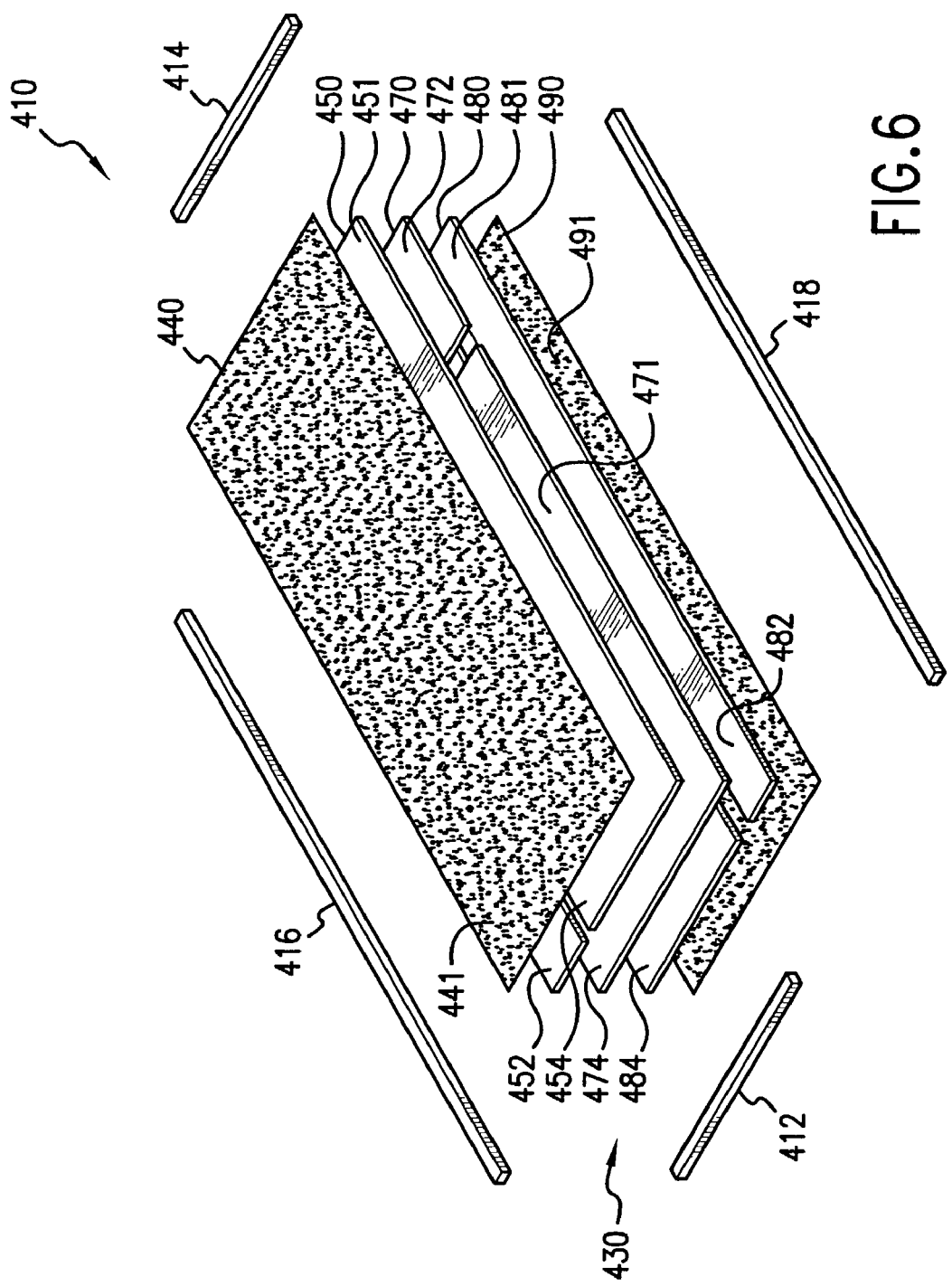
FIG. 6 is a partially-exploded orthogonal view of the door of FIG. 5.

Referring now to FIG. 6, the door 410 includes a core 430, which is disposed between a front face 440 and a rear face 490. The core 430 shown has several layers of material. The layers 450, 470, and 480 may be made of any suitable material. Preferably, at least two of the layers 450 and 480 are made of fire-retardant material. Preferably, the layers of fire-retardant material comprise an MDF. Most preferably, the layers comprise MDF having a density of approximately 42 pcf. The core 430 includes a first fiberboard 450 and a second fiberboard 480. Disposed between the first and second fiberboards 450 and 480 is a layer of porous material 470. The porous layer 470 may be made of any suitable material. Preferably, the porous layer 470 is a foam pad comprised of a thermoplastic polymer, such as expanded polystyrene, having a density of at least 1 pcf.

Each of the first fiberboard 450, the second fiberboard 480, and the porous layer 470 has two major surfaces and a thickness. A height and width of each of the first fiberboard 450, the second fiberboard 480, and the porous layer 470 correspond generally to the height and width of the door 410.

An exemplary embodiment of a core 430 of such a door 410 comprises each of the first fiberboard 450, the second fiberboard 480, and the porous layer 470 having dimensions of three feet wide by eight feet high. In this exemplary embodiment the thickness of each of the first fiberboard 450 and the second fiberboard 480 is nine-sixteenths-of-an-inch and the thickness of the porous layer 470 is three-eighths-of-an-inch. Alternatively, any other suitable dimensions can be provided.

In the embodiment shown in FIG. 6, the first fiberboard 450 can be formed by disposing a vertical splice 452 adjacent to a main sheet 454. Alternatively, the first fiberboard 450 can be a single sheet. The vertical splice 452 is preferably disposed proximate the side stile 416. The width of the vertical splice 452 can be any suitable dimension. For example, the width of the vertical splice can be six inches. The width of both the vertical splice 452 and the main sheet 454 correspond generally to the width of the door 410. Thus, the maximum dimensions of the first fiberboard 450 are three feet wide by eight feet high. The height of the vertical splice 452 is the same as the height of the main sheet 454. Preferably, the dimensions of side stiles 416 and 418 are one-and-one-quarter inches by one-and-one-half inches. Preferably, the dimensions of the bottom rail 412 and the top rail 414 are one-and-one-quarter inches by one-and-one-half inches by thirty-three-and-seven-eighths inches.

The thickness of the first fiberboard 450 shown is nine-sixteenths of an inch. Alternatively, the thickness can be any other suitable thickness. The two major surfaces of the first fiberboard 450 include a front-facing surface 451 and a rear-facing surface (not shown). The front-facing surface 451 and the rear-facing surface of the first fiberboard 450 are disposed on opposing sides of the first fiberboard 450. Either the front-facing surface 451 or the rear-facing surface of the first fiberboard 450 can be disposed adjacent to a rear-facing surface of a front face 440. According to the embodiment, the front-facing surface 451 of the first fiberboard 450 is disposed adjacent to the rear-facing surface of the front face 440. Thus, the rear-facing surface of the first fiberboard 450 is disposed adjacent to one of the major surfaces of the porous layer 470.

Preferably, the porous layer 470 is formed by disposing a horizontal splice 472 adjacent to a main sheet 474. Alternatively, the porous layer 470 can be a single sheet. The horizontal splice 472 is disposed proximate the top rail 414. Alternatively, the horizontal splice 472 is disposed proximate the bottom rail 412. The height of the horizontal splice 472 can be any suitable dimension. For example, the height of the horizontal splice 472 can be 16 inches. The height of both the horizontal splice 472 and the main sheet 474 corresponds to the height of the door 410. Thus, the maximum dimensions of the porous layer 470 are three feet wide by eight feet high. The width of the horizontal splice 472 is the same as the width of the main sheet 474. The thickness of the porous layer 470 is three-eighths of an inch. Alternatively, the thickness can be any other suitable thickness.

The two major surfaces of the porous layer 470 include a front-facing surface 471 and a rear-facing surface (not shown). The front-facing surface 471 and the rear-facing surface of the porous layer 470 are disposed on opposing sides of the porous layer 470. Either the front-facing surface 471 or the rear-facing surface of the porous layer 470 can be disposed adjacent to the rear-facing surface of the first fiberboard 450. According to this embodiment, the front-facing surface 471 of the porous layer 470 is disposed adjacent to the first fiberboard 450. Thus, the rear-facing surface of the porous layer 470 is disposed adjacent to one of the major surfaces of the second fiberboard 480.

The second fiberboard 480 is formed by disposing a vertical splice 482 adjacent to a main sheet 484. Alternatively, the second fiberboard 480 can be a single sheet. The vertical splice 482 is disposed proximate the side stile 416. Alternatively, the vertical splice 482 can be disposed proximate the side stile 414. The width of the vertical splice 482 can be any suitable dimension. For example, the width of the vertical splice 482 can be six inches. Preferably, the width of both the vertical splice 482 and the main sheet 484 corresponds to the width of the door 410. Thus, the maximum dimensions of the second fiberboard 480 are three feet wide by eight three high. The height of the vertical splice 482 is the same as the height of the main sheet 484.

The thickness of the second fiberboard 480 is preferably nine-sixteenths of an inch. Alternatively, the thickness can be any other suitable thickness. The two major surfaces of the second fiberboard 480 include a front-facing surface 481 and a rear-facing surface (not shown). The front-facing surface 481 and the rear-facing surface of the second fiberboard 480 are disposed on opposing sides of the second fiberboard 480. Either the front-facing surface 481 or the rear facing surface of the second fiberboard 480 can be disposed adjacent to the rear-facing surface of the porous layer 470. According to this embodiment, the front-facing surface 481 of the second fiberboard 480 is disposed adjacent to the rear-facing surface of the porous layer 470. Thus, the rear-facing surface of the second fiberboard 480 is disposed adjacent to one of the major surfaces of the rear face 490.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A door comprising:
  a core comprising a porous layer and at least two fire-retardant layers each having a thickness, wherein the porous layer and the at least two fire-retardant layers are coupled together;
  a first exterior layer having a thickness and coupled with the core;
  a second exterior layer coupled with the core; and
  a grooved first pattern disposed on the first exterior layer and having a first depth, wherein the first depth penetrates the thickness of the first exterior layer and a portion of the thickness of one of the at least two fire-retardant layers.

2. The door according to claim 1, further comprising a grooved second pattern disposed on the second exterior layer and having a second depth, wherein the second depth penetrates the thickness of the second exterior layer and a portion of the thickness of the other one of the at least two fire-retardant layers.

3. The door according to claim 2, wherein the first and second depths are about the same.

4. A door comprising:
  a porous layer comprising a thermoplastic polymer;
  two fire-retardant layers each comprising a fiberboard;
  a first exterior layer coupled with one of the fire-retardant layers and a second exterior layer coupled with another one of the fire-retardant layers; and
  a first pattern formed in the first exterior layer and having a first depth and a second pattern formed in the second exterior layer having a second depth, wherein the porous layer is coupled with the two fire-retardant layers and the two fire-retardant layers are separated by the porous layer, and wherein the first depth penetrates the first exterior layer and a portion of the one fire-retardant layer.

5. A door comprising:
  a porous layer comprising a thermoplastic polymer;
  two fire-retardant layers each comprising a fiberboard;
  a first exterior layer coupled with one of the fire-retardant layers and a second exterior layer coupled with another one of the fire-retardant layers; and
  a first pattern formed in the first exterior layer and having a first depth and a second pattern formed in the second exterior layer having a second depth, wherein the porous layer is coupled with the two fire-retardant layers and the two fire-retardant layers are separated by the porous layer, and wherein the second depth penetrates the second exterior layer and a portion of the another fire-retardant layer.

* * * * *

UNITED STATES PATENT AND TRADEMARK OFFICE
CERTIFICATE OF CORRECTION

PATENT NO. : 7,185,468 B2  Page 1 of 1
APPLICATION NO. : 10/284392
DATED : March 6, 2007
INVENTOR(S) : Clark et al.

It is certified that error appears in the above-identified patent and that said Letters Patent is hereby corrected as shown below:

In col. 9, line 65 "order" should be replaced with -- other --.

Signed and Sealed this

Twenty-third Day of October, 2007

JON W. DUDAS
*Director of the United States Patent and Trademark Office*